US008071511B2

(12) United States Patent
Welton et al.

(10) Patent No.: US 8,071,511 B2
(45) Date of Patent: Dec. 6, 2011

(54) METHODS FOR STIMULATING OIL OR GAS PRODUCTION USING A VISCOSIFIED AQUEOUS FLUID WITH A CHELATING AGENT TO REMOVE SCALE FROM WELLBORE TUBULARS OR SUBSURFACE EQUIPMENT

(75) Inventors: Thomas D. Welton, Duncan, OK (US); Richard W. Pauls, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 432 days.

(21) Appl. No.: 11/801,200

(22) Filed: May 10, 2007

(65) Prior Publication Data

US 2008/0280789 A1    Nov. 13, 2008

(51) Int. Cl.
*C09K 8/68* (2006.01)
*C09K 8/52* (2006.01)
*C09K 8/08* (2006.01)
*E21B 37/00* (2006.01)

(52) U.S. Cl. .......... 507/209; 507/90; 507/110; 507/927; 166/311

(58) Field of Classification Search .................... 507/90, 507/110, 209, 240, 927; 166/56, 311
See application file for complete search history.

(56) References Cited

U.S. PATENT DOCUMENTS

| | | | | |
|---|---|---|---|---|
| 3,684,720 | A * | 8/1972 | Richardson | 507/241 |
| 4,353,805 | A | 10/1982 | Kragen et al. | 252/8.55 |
| 5,183,122 | A | 2/1993 | Rowbotham et al. | 175/52 |
| 5,207,778 | A | 5/1993 | Jennings, Jr. | |
| 5,259,980 | A * | 11/1993 | Morris et al. | 510/109 |
| 5,293,942 | A | 3/1994 | Gewanter et al. | |
| 5,346,339 | A * | 9/1994 | Himes et al. | 405/171 |
| 5,897,699 | A | 4/1999 | Chatterji et al. | 106/678 |
| 6,063,738 | A | 5/2000 | Chatterji et al. | 507/269 |
| 6,140,277 | A | 10/2000 | Tibbles et al. | 507/201 |
| 6,165,947 | A | 12/2000 | Chang et al. | |
| 6,263,967 | B1 | 7/2001 | Morris et al. | 166/312 |
| 6,436,880 | B1 | 8/2002 | Frenier | |
| 6,547,871 | B2 | 4/2003 | Chatterji et al. | 106/672 |
| 6,828,280 | B2 | 12/2004 | England | |
| 6,924,253 | B2 | 8/2005 | Palmer et al. | 507/240 |
| 6,929,070 | B2 | 8/2005 | Fu et al. | |
| 6,978,838 | B2 | 12/2005 | Parlar et al. | 166/311 |
| 6,987,083 | B2 | 1/2006 | Phillippi et al. | 507/213 |
| 7,069,994 | B2 | 7/2006 | Cooke, Jr. | |
| 7,156,177 | B2 | 1/2007 | Jones | |
| 7,159,659 | B2 | 1/2007 | Welton et al. | 166/307 |
| 7,192,908 | B2 | 3/2007 | Frenier et al. | |
| 7,228,904 | B2 | 6/2007 | Todd et al. | |
| 7,306,041 | B2 | 12/2007 | Milne et al. | |
| 2004/0011527 | A1 | 1/2004 | Jones et al. | 166/304 |
| 2005/0126781 | A1 | 6/2005 | Reddy et al. | |
| 2006/0014648 | A1 | 1/2006 | Milson et al. | 507/213 |
| 2006/0180309 | A1 | 8/2006 | Welton et al. | 166/282 |
| 2006/0180310 | A1 | 8/2006 | Welton et al. | 166/283 |
| 2006/0183646 | A1 | 8/2006 | Welton et al. | 507/259 |

FOREIGN PATENT DOCUMENTS

| | | |
|---|---|---|
| EP | 0073599 A1 | 3/1983 |
| EP | 1188772 A2 | 3/2002 |
| WO | WO 2004/090282 A1 | 10/2004 |
| WO | WO 2005/121273 A1 | 12/2005 |

OTHER PUBLICATIONS

James et. al., "Application of a Fully Viscosified Scale Squeeze for Improved Placement in Horizontal Wells", SPE International Symposium on Oilfield Scale, May 2005, Paper No. 94593.*
Aker Kvaerner Well Services, Powertrac Cone Crusher Scale Mill Concept; WWW.OTCNET.ORG/2007/SPOTLIGHT/AKER-KVAERNER-WELL.HTML, 2007.
Mike Crabtree, David Eslinger, Phil Fletcher, Matt Miller, Ashley Johnson, George King, "Fighting Scale-Removal and Prevention"; Oilfield Review; pp. 30-45, Autumn 1999.
"Advanced Corrosion & Scale Management in Oil & Gas"; Oil & Gas IQ, Copyright IQPC Ltd., 2006.
Sameh F. Darwish, ALAA A. Moniem, "SPE 88597, in Hibitor Squeeze Design and Returns Monitoring to Manage Downhole Scale Problem", 2004.
Schlumberger, Oilfield Glossary; WWW.GLOSSARY.OILFIELD.SLB.COM/DISPLAY.CFM?TERM=SCALE, 2007.
Halliburton, "Top Technology Solutions 2006: Near Wellbore Stimulation"; WWW.HALLIBURTON.COM, 2006.
Peter Rose, Tianfu Xu,Katie Kovac, Mike Mella, Karsten Pruess, "Chemical Stimulation in Near-Wellbore Geothermal Formations: Silica Dissolution in the Presence of Calcite at High Temperature and High pH"; Energy and Geoscience Institute at the University of Utah, Salt Lake City, Utah; Earth Sciences Div., Lawrence Berkeley National Laboratory, University of California, Berkeley, CA, 2007.
"Scale"; SINTEF Petroleum Research; WWW.SINTEF.COM, Aug. 2006.
E.J. Mackey, M.M. Jordan, N.D. Feasey, D. Shah, P. Kumar, S.A. Ali; "Integrated Risk Analysis for Scale Management in Deepwater Developments"; SPE Production & Facilities; pp. 138-154, May 2005.
AATCC Test Method 149-2002—Chelating Agents: Chelation Value of Aminopolycarboxlic Acids and Their Salts; Calcium Oxalate Method; American Association of Textile Chemists and Colorists; Research Triangle Park, NC, 2005.
Simultaneous Gravel Packing and Filter-Cake Cleanup With Shunt Tubes in Openhole Completions: A Case History From the Gulf of Mexico; Keith Godwin, SPE Drilling & Completion; pp. 174-178, Sep. 2002.
International Search Report and Written Opinion of Application No. PCT/GB2008/001615, Sep. 5, 2008.

* cited by examiner

*Primary Examiner* — Timothy J. Kugel
*Assistant Examiner* — Aiqun Li
(74) *Attorney, Agent, or Firm* — Robert A. Kent; Booth Albanesi Schroeder LLC

(57) ABSTRACT

A method for treating a wellbore tubular or subsurface completion equipment to help remove scale is provided. In general, the method comprises the steps of: (A) determining the likelihood of the presence of carbonate scale in the wellbore tubular or subsurface completion equipment; (B) forming or providing a treatment fluid comprising: (i) water; (ii) a chelating agent capable of forming a heterocyclic ring that contains a metal ion attached to at least two nonmetal ions; and (iii) a viscosity-increasing agent; and (C) introducing the treatment fluid into the wellbore tubular or the subsurface completion equipment.

14 Claims, No Drawings

METHODS FOR STIMULATING OIL OR GAS PRODUCTION USING A VISCOSIFIED AQUEOUS FLUID WITH A CHELATING AGENT TO REMOVE SCALE FROM WELLBORE TUBULARS OR SUBSURFACE EQUIPMENT

CROSS-REFERENCE TO RELATED APPLICATIONS

Not applicable

STATEMENT REGARDING FEDERALLY SPONSORED RESEARCH OR DEVELOPMENT

Not applicable

REFERENCE TO MICROFICHE APPENDIX

Not applicable

TECHNICAL FIELD

The invention generally relates to production enhancement to increase hydrocarbon production from a subterranean formation. More particularly, the invention relates to methods of treating downhole wellbore tubulars or subsurface completion equipment for mineral deposits, which deposits are generally referred to as scale, and especially for deposits containing calcium carbonate.

SUMMARY OF THE INVENTION

According to the invention, a method for treating at least a portion of a downhole wellbore tubular or subsurface completion equipment is provided. In general, the method comprises the steps of: (A) determining the likelihood of the presence of scale in the wellbore tubular or the subsurface completion equipment; (B) forming or providing a treatment fluid comprising: (i) water; (ii) a chelating agent capable of forming a heterocyclic ring that contains a metal ion attached to at least two nonmetal ions; and (iii) a viscosity-increasing agent; and (C) introducing the treatment fluid into the wellbore tubular or subsurface completion equipment.

Other and further objects, features and advantages of the present invention will be readily apparent to those skilled in the art when the following description of the preferred embodiments is read in conjunction with the accompanying drawings

DETAILED DESCRIPTION OF A PREFERRED EMBODIMENT

Scale can be comprised of various mineral component deposits that can form over the inner walls of downhole casing, production tubing, and completion equipment, such as valves, gas-lift mandrels, and fluid pumps. Scale can be deposited along water paths in a subterranean formation, through wellbore tubulars, to surface equipment and surface tubulars. The scale can become so voluminous that it clogs the downhole wellbore tubulars or downhole equipment.

Scale in the oil field environment can be formed as a result of mixing two incompatible waters downhole to create produced water that is oversaturated with scale-forming minerals. Scale can also be formed when the state of the water being produced is changed such that the solubility limit for one or more mineral components is exceeded. The solubility limit of each mineral component in an aqueous solution has a complex relationship to several factors, including temperature, pressure, the concentrations of other mineral components in solution, and pH. In general, but not for all minerals, a decrease in temperature tends to decrease the water solubility of the mineral. Similarly, a substantial decrease in pressure tends to decrease the water solubility of a mineral. Further, the solubility of a mineral can be impacted by the concentrations of other minerals in the solution. The solubility of certain minerals, such as carbonate minerals, is also increased in the presence of acid gases such as carbon dioxide and hydrogen sulfide, where carbonate solubility tends to increase as with increasing acidity. Carbon dioxide and hydrogen sulfide at high pressure can make water quite acidic. Water containing such gases produced from a subterranean formation containing carbonate rock can have a high concentration of dissolved carbonate.

In producing water from a subterranean formation, the temperature tends to decrease and the pressure can also be decreased, both of which changes can contribute to precipitating minerals from the water to form scale in downhole wellbore tubulars and equipment. In the case of releasing pressure, carbon dioxide or hydrogen sulfide may also be released, allowing the pH of the produced water to rise. Such changes can cause scale deposits. Sometimes so much scale can be deposited that the scale blocks the fluid flow path through the downhole wellbore tubulars or equipment, and even downstream in surface tubulars and equipment.

Although the solubility limits of various minerals have complex relationships with temperature, pressure, the concentrations of other minerals in the solution, and pH, such relationships are becoming increasingly well known and understood and it is possible to make computer models of downhole conditions that are likely to produce scale deposits.

In general, the purpose of this invention is to improve delivery of a chelating agent and the flowing back of the fluid for scale removal by increasing the viscosity of the treatment fluid. A chelating agent can be utilized to help dissolve and remove carbonates and other minerals from a wellbore tubular. The concentration of the chelating agent is sufficient to help dissolve a substantial amount of carbonate material. The treatment fluid containing the chelating agent includes a viscosity-increasing agent to help with placement of the treatment fluid and to help carry out some scale with the flow back of the treatment fluid. When the viscosity of the fluid is increased or gelled, the treatment fluid can provide better coverage and carry suspended particles, including small pieces of scale. The treatment fluid can be a single fluid that dissolves calcium/magnesium/iron carbonate solids in a wellbore tubular at a controlled rate and under a wide range of conditions, especially over a broad range of pH and time. The invention can be advantageous because it can provide methods for treating wellbore tubulars for such purposes using treatment fluids that are non-acid containing and non-corrosive.

The treatment methods according to the invention are expected to be effective for applications associated with: removal of carbonate scale from downhole wellbore tubulars or subsurface wellbore completion equipment, particularly where the use of strongly acidic fluids might be problematic, for example, in high-temperature formations due to reaction rates, or due to corrosion, etc.

As used herein, the words "comprise," "has," and "include" and all grammatical variations thereof are each intended to have an open, non-limiting meaning that does not exclude additional elements or steps.

In general, the new approach is a method for treating at least a portion of a downhole wellbore tubular or subsurface equipment, the method comprising the steps of: (A) determining the likelihood of the presence of scale in the downhole wellbore tubular or subsurface equipment; (B) forming or providing a treatment fluid comprising: (i) water; (ii) a chelating agent capable of forming a heterocyclic ring that contains a metal ion attached to at least two nonmetal ions; and (iii) a viscosity-increasing agent; and (C) introducing the treatment fluid into the wellbore tubular or subsurface equipment.

Determining the likelihood of the presence of carbonate scale in the downhole wellbore tubular or subsurface equipment is an important step in the remediation process according to the invention.

Scale in wellbore tubulars or subsurface completion equipment tends to occur as a thick layer on the inside wall of the tubular or completion equipment. The scale lowers the production rate from the wellbore by increasing the surface roughness of the inner wall of the tubular or equipment and reducing the cross-sectional flow area. The pressure required to push a fluid through the tubular area increases, flow decreases, and production decreases. In an injection well, scale damage is usually caused by temperature-activated autoscaling. In addition, incompatible mixing of different waters can occur when injection water contacts either natural formation water or completion brine. Scale formed in an injection well can decrease the effectiveness of a water-flood strategy. In a production well, scale damage can occur with a change in state in the produced water, for example, a decrease in temperature and pressure, or an increase in pH from a relatively acidic state. Regardless of the particular origin or cause of the scale, a reduction in fluid flow can be an indicator of the build of scale.

According to another embodiment of the invention, production analysis can indicate wellbore tubing scale, especially if a well suddenly demonstrates tubing constraints that were not present during early production.

The onset of water production is often a sign of potential scale problems, especially if it coincides with a simultaneous reduction in oil production. Tracking water chemistry and in particular the dissolved ion content of the produced water can be important indicators for the likelihood of scale formation. Dramatic changes in the concentrations of scaling ions, especially if coinciding with reduced oil production and increased water cut, can signal that injection water has broken through and scale is beginning to form. A review of the well history in response to any previous chemical interventions, such as acid treatments, can help in the making of these interpretations.

Determining the likelihood of the presence of carbonate scale can also be obtained by taking samples of downhole scale or X-ray evidence from core analysis. Gamma ray log interpretation often indicates barium sulfate scale because naturally occurring radioactive strontium tends to precipitate with this type of scale mineral.

Wells with intelligent completions and permanent monitoring systems can also be designed to detect changes in water chemistry. Downhole scale sensors and permanent monitoring applications are areas of active research.

According to another embodiment of the invention, chemical modeling can be used to determine the likelihood of the presence of scaling based on tracking water analysis for mineral concentrations and other conditions, such as temperature, pressure, pH, and gas-phase compositions. The results of such techniques can be used to indicate the need for scale treatment of the downhole wellbore tubulars or subsurface equipment.

It is believed that the chelating agent in the treatment fluid can react with and dissolve calcium carbonate, magnesium carbonate, dolomite, iron carbonate, and similar materials of scale in the wellbore tubular, helping to re-open up the tubular, whereby hydrocarbon production through the tubular can be enhanced. $CaCO_3$ and $CaMg(CO_3)_2$ may precipitate from water as scale in wellbore tubulars. Typical scales are of calcium carbonate, calcium sulfate, barium sulfate, strontium sulfate, iron sulfide, iron oxides, iron carbonate, various silicates and phosphates and oxides, or any of a number of compounds insoluble or slightly soluble in water. Although it may not be expected to dissolve all of the components of scale, the chelating agent can be helpful in removing calcium carbonate, magnesium carbonate, dolomite, iron carbonate, and similar materials of scale.

As used herein, to chelate means to combine a metal ion with a chemical compound to form a ring. "The adjective chelate, derived from the great claw or chela (chely-Greek) of the lobster or other crustaceans, is suggested for the caliper like groups which function as two associating units and fasten to the central atom so as to produce heterocyclic rings." Sir Gilbert T. Morgan and H. D. K. Drew [J. Chem. Soc., 1920, 117, 1456].

Preferably, the water further includes a water-soluble inorganic salt dissolved therein. The purpose of the inorganic salt can be, for example, to weight the water of the treatment fluid or to make the treatment fluid more compatible and less damaging to the subterranean formation. It should be understood, of course, that a source of at least a portion of the water and the inorganic salt can be selected from the group consisting of natural or synthetic brine or seawater. Inorganic salt or salts can also be mixed with the water of the treatment fluid to artificially make up or increase the inorganic salt content in the water. Alternatively for these types of purposes, a water-soluble salt replacement can be utilized such as tetramethyl ammonium chloride (TMAC) and similar organic compounds.

It is a particular advantage of the method according to the invention to be able to help remove carbonate and similar materials without the use of strongly acidic treatment compositions, that is, without the use of treatment compositions having a pH less than 2. According to a preferred embodiment of the invention, the pH of the treatment fluid is equal to or greater than 2, which is above the pH of strong inorganic acids that have been used to help dissolve and remove carbonate materials from the formation.

More preferably, according to the invention, the pH of the treatment fluid is equal to or greater than 5, which is well above the pH of spent acid fluids used for the purpose of removing carbonate, where the pH of an acid fluid is typically less than about 3.5. The compositions of the present invention can be used to help dissolve and remove carbonate materials from the formation with less acidic compositions. In some applications, acidic compositions can be damaging to the well or hydrocarbon production.

Most preferably, according to the invention, the pH of the treatment fluid is in the range of 6-12, which can be used to avoid or reduce the use of substantially acidic compositions in treating the formation. It is important to note, of course, that different chelating agents work better in certain pH ranges than other ranges. Some chelating agents can be effective in the higher pH ranges. One skilled in the art would also recognize the obvious advantage of using a non-acid fluid may reduce the rate of corrosion.

In particular, the chelating agent is selected to be effective for chelating at least calcium ions. It is also highly desirable that the chelating agent is soluble in distilled water at standard temperature and pressure at a concentration of at least 0.2 mole-equivalent for calcium ions per liter of the distilled water. As a test for whether or not the chelating agent would be effective for use in the present invention, it is believed that a solution of the chelating agent at a concentration of 0.2 mole-equivalent for calcium ions per liter of the distilled water should be effective for chelating at least 0.1 mole calcium ions per liter. Preferably, the test solution is effective when adjusted to have a pH in the range of 5-6. More preferably, the test solution is effective when adjusted to have a pH in the range of 6-8. One skilled in the art would recognize that similar tests can be performed for other ions such as magnesium, iron, etc.

There are numerous examples of suitable chelating agents. For various reasons including effectiveness, ready availability, and economical cost, the chelating agent is preferably selected from the group consisting of ethylenediamine tetraacetic acid ("EDTA"), nitrilotriacetic acid ("NTA"), hydroxyethylethylenediaminetriacetic acid ("HEDTA"), diethylenetriaminepentaacetic acid ("DTPA"), propylenediaminetetraacetic acid ("PDTA"), ethylenediaminedi(o-hydroxyphenylacetic) acid ("EDDHA"), a sodium or potassium salt of any of the foregoing, dicarboxymethyl glutamic acid tetrasodium salt ("GLDA"), a derivative of any of the foregoing or any combination in any proportion thereof. It is to be understood, of course, that a derivative may be employed provided that the substitution of an atom or group of atoms in the parent compound for another atom or group of atoms does not substantially impair the function of the derivative relative to the parent compound. A derivative would also include compounds that do not have the functionality, but would regain functionality due to some process in use such as a reaction, hydrolysis, degradation, etc. The chelating agent is preferably at a concentration of at least 0.01% by weight of the water. More preferably, the chelating agent is at a concentration in the range of 1% to 80% by weight of the water.

The viscosity-increasing agent would typically comprise a polymeric material. For various reasons including effectiveness, ready availability, and economical cost, the polymeric material is preferably selected from the group consisting of: guar gum and its derivatives, cellulose derivatives, welan gum, xanthan biopolymer and its derivatives, diutan and its derivatives, scleroglucan and its derivatives, succinoglycan biopolymer and its derivatives, and any combination of any of the foregoing in any proportion. A preferred polymer is of the nature taught in U.S. Patent Application Serial No. 20060014648, which is incorporated herein by reference in its entirety.

According to another aspect of the invention, the viscosity-increasing agent can advantageously comprise a viscoelastic surfactant. One perceived advantage of a surfactant gel is that it has much less potential for leaving a polymer residue. The viscoelastic surfactant may comprise any viscoelastic surfactant known in the art, any derivative thereof, or any combination thereof. As used herein, the term "viscoelastic surfactant" refers to a surfactant that imparts or is capable of imparting viscoelastic behavior to a fluid due, at least in part, to the association of surfactant molecules to form viscosifying micelles. These viscoelastic surfactants may be cationic, anionic, nonionic, or amphoteric/zwitterionic in nature.

The viscoelastic surfactants may comprise any number of different compounds, including methyl ester sulfonates (e.g., as described in U.S. patent application Ser. Nos. 11/058,660 (now U.S. Pat. No. 7,299,874), 11/058,475 (now Application No. 2006/0180308), 11/058,612 (now Application No. 2006/0180309), and 11/058,611 (now Application No. 2006/0183646), filed Feb. 15, 2005, each of which is assigned to Halliburton Energy Services, Inc., the relevant disclosures of which are incorporated herein by reference), hydrolyzed keratin (e.g., as described in U.S. Pat. No. 6,547,871 issued Apr. 15, 2003 to Halliburton Energy Services, Inc., the relevant disclosure of which is incorporated herein by reference), sulfosuccinates, taurates, amine oxides, ethoxylated amides, alkoxylated fatty acids, alkoxylated alcohols (e.g., lauryl alcohol ethoxylate, ethoxylated nonyl phenol), ethoxylated fatty amines, ethoxylated alkyl amines (e.g., cocoalkylamine ethoxylate), betaines, modified betaines, alkylamidobetaines (e.g., cocoamidopropyl betaine), quaternary ammonium compounds (e.g., trimethyltallowammonium chloride, trimethylcocoammonium chloride), derivatives of any of the foregoing, and any combinations of any of the foregoing in any proportion.

Suitable viscoelastic surfactants may comprise mixtures of several different compounds, including but not limited to: mixtures of an ammonium salt of an alkyl ether sulfate, a cocoamidopropyl betaine surfactant, a cocoamidopropyl dimethylamine oxide surfactant, sodium chloride, and water; mixtures of an ammonium salt of an alkyl ether sulfate surfactant, a cocoamidopropyl hydroxysultaine surfactant, a cocoamidopropyl dimethylamine oxide surfactant, sodium chloride, and water; mixtures of an ethoxylated alcohol ether sulfate surfactant, an alkyl or alkene amidopropyl betaine surfactant, and an alkyl or alkene dimethylamine oxide surfactant; aqueous solutions of an alpha-olefinic sulfonate surfactant and a betaine surfactant; and any combination of the foregoing mixtures in any proportion. Examples of suitable mixtures of an ethoxylated alcohol ether sulfate surfactant, an alkyl or alkene amidopropyl betaine surfactant, and an alkyl or alkene dimethylamine oxide surfactant are described in U.S. Pat. No. 6,063,738, issued May 16, 2000 to Halliburton Energy Services, Inc., the relevant disclosure of which is incorporated herein by reference. Examples of suitable aqueous solutions of an alpha-olefinic sulfonate surfactant and a betaine surfactant are described in U.S. Pat. No. 5,897,699, the relevant disclosure of which is incorporated herein by reference. Examples of commercially-available viscoelastic surfactants suitable for use in the present invention may include, but are not limited to, Mirataine BET-O 30™ (an oleamidopropyl betaine surfactant available from Rhodia Inc., Cranbury, N.J.), Aromox APA-T™ (an amine oxide surfactant available from Akzo Nobel Chemicals, Chicago, Ill.), Ethoquad O/12 PG™ (a fatty amine ethoxylate quat surfactant available from Akzo Nobel Chemicals, Chicago, Ill.), Ethomeen T/12™ (a fatty amine ethoxylate surfactant available from Akzo Nobel Chemicals, Chicago, Ill.), Ethomeen S/12™ (a fatty amine ethoxylate surfactant available from Akzo Nobel Chemicals, Chicago, Ill.), and Rewoteric AM TEG™ (a tallow dihydroxyethyl betaine amphoteric surfactant available from Degussa Corp., Parsippany, N.J.).

According to a preferred embodiment of the invention, the viscosity-increasing agent is at a concentration in the treatment fluid that is at least sufficient to make the viscosity of the treatment fluid greater than water. More preferably, the viscosity-increasing agent is at a concentration in the treatment fluid that is sufficient to make the viscosity of the treatment fluid greater than 5 cP when measured at 511 reciprocal seconds on a Fann 35A model viscometer with a number 1 spring and bob. More preferably, the viscosity-increasing agent is at a concentration in the treatment fluid that is sufficient to make the viscosity of the treatment fluid in the range of 10 cP to 100 cP when measured at 511 reciprocal seconds on a Fann 35A model viscometer with a number 1 spring and bob.

According to another preferred embodiment according to the invention, the viscosity-increasing polymeric agent is at a concentration of at least 0.05% by weight of the water. More preferably, the viscosity-increasing agent is at a concentration in the range of 0.05% to 10% by weight of the water.

It is contemplated that it will sometimes be desirable to further increase the viscosity of the treatment fluid. One technique for doing so is to crosslink a polymeric viscosity-increasing agent. According to such an embodiment of the invention, the treatment fluid further comprises a crosslinking agent to crosslink the polymeric material of the viscosity-increasing agent. A multitude of crosslinking agents for such purposes are known in the art. Preferably, the crosslinking agent is selected from the group consisting of: borate releasing compounds, a source of titanium ions, a source of zirconium ions, a source of antimony ions, a source of aluminum ions, a source of periodate ions, a source of permanganate ions, and any combination thereof in any proportion. According to a preferred embodiment, the crosslinking agent is at a concentration of at least 0.025% by weight of the water. According to a more preferred embodiment of the invention, the crosslinking agent is at a concentration in the range of 0.025% to about 1% by weight of the water.

According to a preferred embodiment of the invention, the treatment fluid is allowed a sufficient time to attack the scale in the wellbore tubular.

According to another preferred embodiment of the invention, the treatment fluid is flowed back from the well without breaking the viscosity of the fluid. The purpose of the maintaining the viscosity of the treatment fluid during a step of flowing back of the treatment fluid is to help carry particles and pieces of the scale that may be loosened from the scale layers but not completely dissolved by the treatment fluid.

It is contemplated that the methods according to the invention can include foaming of the treatment fluid. According to these embodiments, the treatment fluid further comprises: an additive for foaming. The treatment fluid may be formed at a remote location and provided to the well site for the treatment method, or it can be formed locally at the well site. The treatment fluid preferably further comprises: a sufficient gas to form a foam. As used herein, foam also refers to commingled fluids. Preferably, the gas would be mixed with the other constituents of the treatment fluid at the well site to form a foamed or co-mingled fluid. According to a preferred embodiment of the invention, the gas is selected from the group consisting of: air, $CO_2$, nitrogen, and any combination thereof in any proportion. In applications of the method utilizing a gas, typically, the gas is at a concentration in the range of 5% to 95% by volume of the water.

According to one aspect of the methods of the invention, the step of introducing the treatment fluid into the wellbore further comprises: introducing the treatment fluid at a rate and pressure below the fracture gradient of the subterranean formation.

According to yet another aspect of the methods of the invention, the methods further comprise the step of: applying an afterflush fluid to the portion of the wellbore tubular. For example, the afterflush fluid can comprise: water, a gas, a brine, a hydrocarbon, or a mixture thereof.

An example of a treatment fluid for use in the methods according to the invention was formed as shown in the following Table 1:

TABLE 1

| Component | Per 200 ml | Per 1000 gallons |
|---|---|---|
| Water | 157.6 ml | 788 US gals |
| H4EDTA 98% | 46.61 g | 1987 lbs |
| Potassium Hydroxide Solid 96% | 20.95 g | 870 lbs |
| Xanthan | 0.96 g | 40 lb/Mgal |

The rheological properties of the example composition were measured on a Fann Model 35 A viscometer as shown in the following Table 2:

TABLE 2

| | 300 rpm | 600 rpm |
|---|---|---|
| Dial Reading at room temperature | 21 | 29 |
| Dial Reading at room temperature after 4 hours at 175° F. | 29 | 35 |

Therefore, the methods of the present invention are well adapted to carry out the objects and attain the ends and advantages mentioned as well as those that are inherent therein. While numerous changes may be made by those skilled in the art, such changes are encompassed within the spirit of this invention as defined by the appended claims.

What is claimed is:

1. A method for treating a downhole wellbore tubular or subsurface completion equipment, the method comprising the steps of:
   (A) determining the likelihood of the presence of scale in the downhole wellbore tubular or subsurface completion equipment;
   (B) forming or providing a treatment fluid comprising:
      (i) water;
      (ii) a chelating agent capable of forming a heterocyclic ring that contains a metal ion attached to at least two nonmetal ions; and
      (iii) a viscosity-increasing agent, wherein the viscosity-increasing agent comprises a polymeric material and wherein the viscosity-increasing agent is at a concentration in the treatment fluid that is at least sufficient to make the viscosity of the treatment fluid greater than 5 cP when measured at 511 reciprocal seconds on a Fann 35A model viscometer with a number 1 spring and bob;
   (C) introducing the treatment fluid into the downhole wellbore tubular or the subsurface completion equipment;
   (D) allowing the treatment fluid sufficient time to dissolve scale in the downhole wellbore tubular or the subsurface completion equipment; and
   (E) flowing back the treatment fluid from the downhole wellbore tubular or the subsurface completion equipment without breaking the viscosity of the fluid.

2. The method according to claim 1, wherein the pH of the treatment fluid is equal to or greater than 2.

3. The method according to claim 1, wherein the pH of the treatment fluid is equal to or greater than 5.

4. The method according to claim 1, wherein the pH of the treatment fluid is in the range of 6-12.

5. The method according to claim 1, wherein the chelating agent is effective for chelating at least calcium ions.

6. The method according to claim 1, wherein the chelating agent is soluble in distilled water at standard temperature and pressure at a concentration of at least 0.2 mole equivalent for calcium ions per liter of the distilled water.

7. The method according to claim 6, wherein a test solution of the chelating agent at a concentration of 0.2 mole-equivalent for calcium ions per liter of the distilled water is effective for chelating at least 0.1 mole calcium ions from calcium carbonate per liter.

8. The method according to claim 7, wherein prior to exposing the test solution of the chelating agent to the calcium carbonate, the test solution is adjusted to have a pH in the range of 5-6.

9. The method according to claim 1, wherein the chelating agent is selected from the group consisting of ethylenediamine tetraacetic acid ("EDTA"), nitrilotriacetic acid ("NTA"), hydroxyethylethylenediaminetriacetic acid ("HEDTA"), diethylenetriaminepentaacetic acid ("DTPA"), propylenediaminetetraacetic acid ("PDTA"), ethylenediaminedi(o-hydroxyphenylacetic) acid ("EDDHA"), a sodium or potassium salt of any of the foregoing, dicarboxymethyl glutamic acid tetrasodium salt ("GLDA"), a derivative of any of the foregoing, or any combination of any of the foregoing in any proportion.

10. The method according to claim 1, wherein chelating agent is at a concentration in the range of 1 to 80% by weight of the water.

11. The method according to claim 1, wherein the polymeric material is selected from the group consisting of: guar gum and its derivatives, cellulose derivatives, welan gum, xanthan biopolymer and its derivatives, diutan and its derivatives, scleroglucan and its derivatives of succinoglycan biopolymer and its derivatives, and any combination thereof any of the foregoing in any proportion.

12. The method according to claim 1, wherein the viscosity-increasing agent is at a concentration in the range of 0.05% to 10% by weight of the water.

13. The method according to claim 1, wherein the treatment fluid further comprises: an additive for foaming.

14. The method according to claim 1, wherein the step of introducing the treatment fluid into the well bore further comprises: introducing the treatment fluid at a rate and pressure below the fracture gradient of the subterranean formation.

* * * * *